Figure 1:
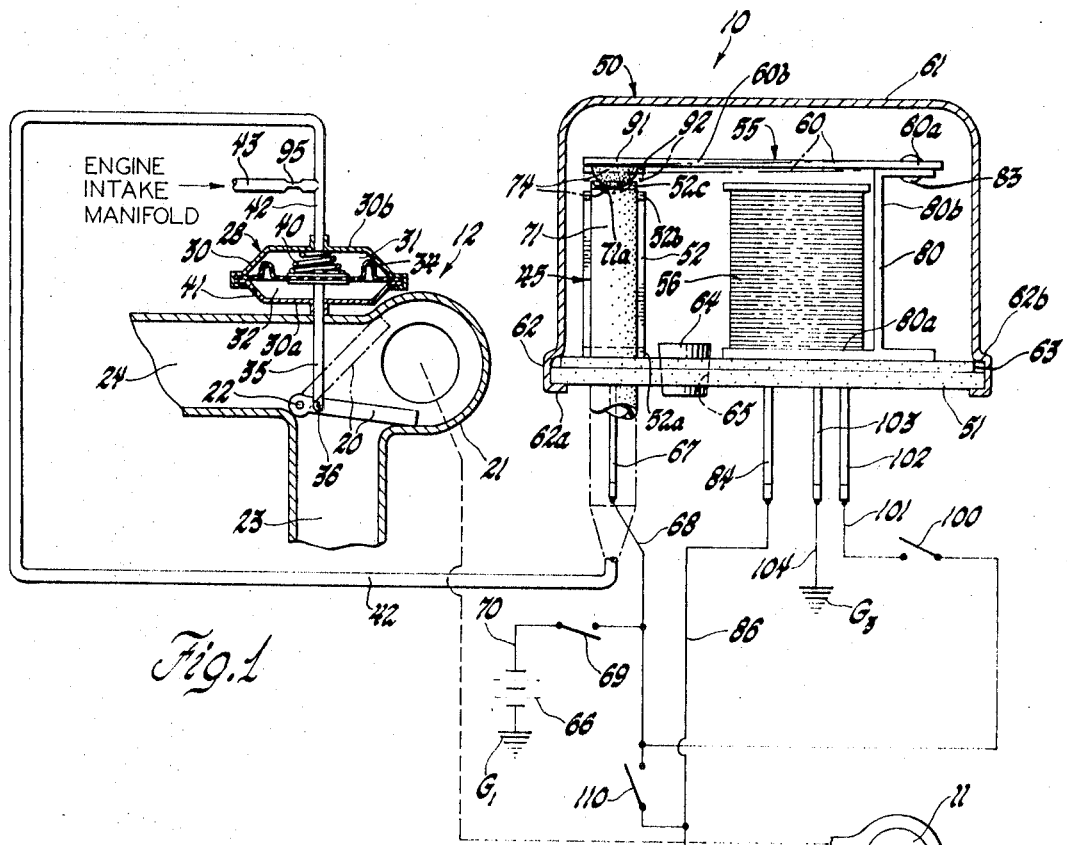

United States Patent

[11] 3,599,128

| [72] | Inventor | Jonathan N. Fruth<br>Kokomo, Ind. |
|------|----------|-----------------------------------|
| [21] | Appl. No. | 834,471 |
| [22] | Filed | June 18, 1969 |
| [45] | Patented | Aug. 10, 1971 |
| [73] | Assignee | General Motors Corporation<br>Detroit, Mich. |

[54] CONTROL MECHANISM FOR SIMULTANEOUSLY CONTROLLING OPERATION OF FLUID AND ELECTRICALLY OPERATED DEVICES
6 Claims, 2 Drawing Figs.

| [52] | U.S. Cl. | 335/1,<br>200/61.86 |
|------|----------|---------------------|
| [51] | Int. Cl. | H01h 9/00 |
| [50] | Field of Search | 251/129;<br>200/61.86; 335/1, 128, 219 |

[56] References Cited
UNITED STATES PATENTS

| 1,734,258 | 11/1929 | Kraft et al. | 251/129 |
| 2,265,648 | 12/1941 | Kopp | 200/61.68 |
| 2,333,261 | 11/1943 | Mantz | 200/61.68 |
| 2,406,246 | 8/1946 | Ogden | 200/61.68 |

*Primary Examiner*—Harold Broome
*Attorneys*—W. E. Finken and W. A. Schuetz

ABSTRACT: In a preferred form, a control mechanism for simultaneously controlling operation of an electrically driven blower and a pneumatically actuatable air vent for controlling admission of fresh air to the blower of a comfort control system of an automotive vehicle is disclosed. The control mechanism comprises an electromagnetic relay means carried by a housing and which includes a bifurcated armature which functions both as a switch and a valve actuator for controlling energization of the electrically driven blower and for controlling operation of the pneumatically actuatable fresh air vent control.

PATENTED AUG 10 1971 3,599,128

INVENTOR.
Jonathan N. Fruth
BY
W. A. Schuetz
ATTORNEY 3,599,128

CONTROL MECHANISM FOR SIMULTANEOUSLY CONTROLLING OPERATION OF FLUID AND ELECTRICALLY OPERATED DEVICES

The present invention relates to a control mechanism for use in simultaneously controlling operation of a fluid operated device and an electrically operated device, and more particularly to a control mechanism for simultaneously controlling operation of an electrically driven blower and a pneumatically actuatable fresh air vent control of a comfort control system of an automotive vehicle. The blower is adapted to draw air from an air inlet means and circulate the same in the passenger compartment of a vehicle. The air vent control is operable to either communicate the air inlet means with the passenger compartment to recirculate the air or with the external atmosphere so that fresh air is circulated.

An object of the present invention is to provide a new and improved control mechanism for use in simultaneously controlling operation of a fluid operated device and an electrically operated device, and which includes an electromagnetic relay means having an armature which serves the dual function of being a switch element for controlling energization and deenergization of the electrically operated device and as a valve actuator for a valve means for controlling communication between a fluid source and the pneumatically actuatable device.

Another object of the present invention is to provide a new and improved control mechanism for use in simultaneously controlling operation of a vacuum operated device and an electrically operated device, and which includes an electromagnetic relay means having a selectively energizable coil and a leaf spring armature having a bifurcated end, and wherein one leg of the bifurcated end serves as a switch element for controlling operation of the electrically operated device and the other leg serves as a valve actuator for controlling opening and closing movement of a vent valve member, which in turn controls operation of the vacuum operated device.

A further object of the present invention is to provide a new and improved control mechanism for simultaneously controlling communication between the atmosphere and a vacuum responsive means for opening and closing a fresh air vent control for controlling the admission of fresh air into an automotive vehicle and for controlling energization of an electrically driven blower for circulating the air inside the automotive vehicle, and which includes an electromagnet relay means having a selectively energizable coil and a flexible leaf spring armature, and wherein serves as a switch element for controlling energization of the electrically driven blower and the other leg of which serves as a valve actuator for a vent valve means for controlling communication between the atmosphere and the vacuum responsive means to effect operation of the latter.

The control mechanism for controlling operation of the blower motor and air vent control comprises, in the preferred embodiment, a housing means having a base at one end thereof, an electrical terminal carried by the base, a vent valve means which includes a tubular portion having an open end normally in communication with the atmosphere, and an electromagnetic relay means having a selectively energizable coil and a flexible leaf spring armature carried by a bracket secured to the base. The flexible armature has a bifurcated free end and with one of the legs of the bifurcated end being disposed above the stationary electrical contact and the other leg of the bifurcated end carrying a resilient valve member disposed above the open end of the tubular portion of the valve means. The coil when energized flexes the armature to move one leg into engagement with the electrical terminal to provide a conductive path therebetween for effecting energization of the blower motor and the other leg and valve member into engagement with the open end of the tubular portion to block communication between the atmosphere and the tubular portion for effecting operation of the air vent control.

Figure 2:
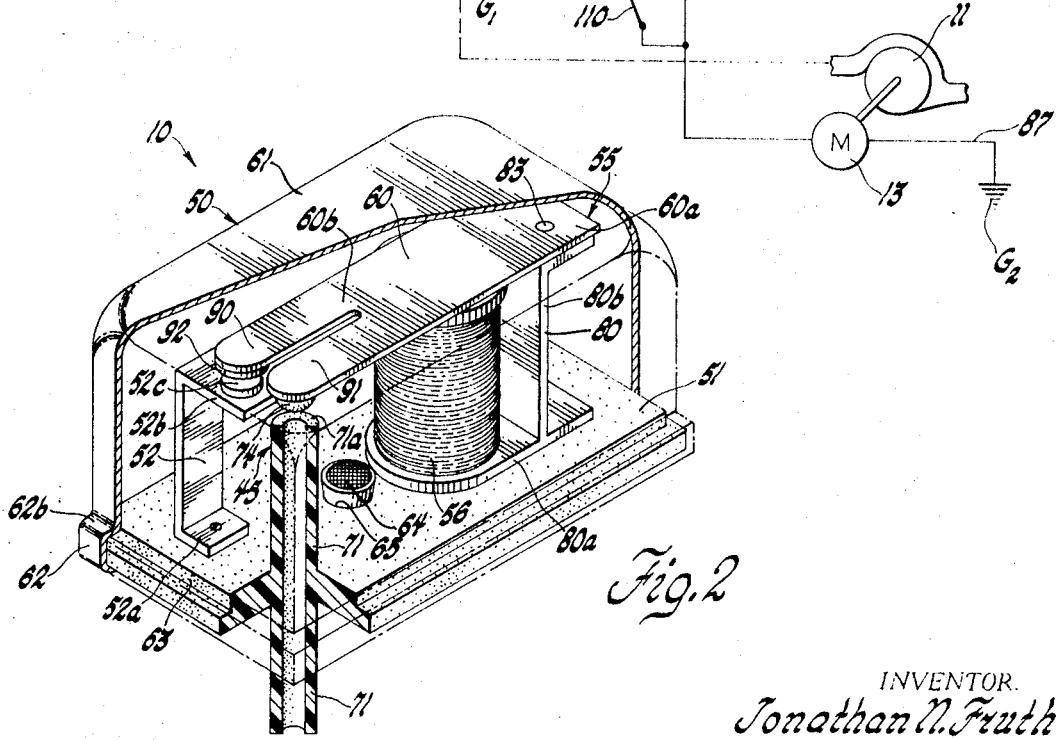

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 1 is a partial schematic view of a comfort control system of an automotive vehicle and in which the control mechanism of the present invention is shown partly in side elevation and partly in section; and FIG. 2 is a fragmentary perspective view, with portions shown in section, of the control mechanism of the present invention.

The present invention provides a novel control mechanism for use in simultaneously controlling operation of a fluid operated device or devices and an electrically operated device or devices. Although the control mechanism of the present invention could be used to control various types of fluid and electrically operated devices, it is particularly susceptible for use in simultaneously controlling operation of a vacuum operated fresh air vent control and an electrically driven blower of a comfort control system of an automotive vehicle. Accordingly, for the purposes of illustration, the control mechanism of the present invention will be described as being used for the latter purpose.

FIG. 1 of the drawing schematically shows part of a comfort control system for an automotive vehicle and a preferred embodiment of a control mechanism 10 for controlling operation of an electrically driven blower 11 and an air vent control 12 thereof. The blower 11 of the comfort control system is driven by an electric motor 13 and is operable to circulate air within the passenger compartment of the automotive vehicle (not shown). The blower 11 draws either outside fresh air or air within the passenger compartment of the vehicle and delivers it under pressure either directly to the passenger compartment or to a heater and/or air conditioner (not shown) for heating and/or cooling the same prior to its delivery into the interior passenger compartment of the vehicle. For a complete description of such a comfort control system, resort may be had to U.S. Pat. No. 3,263,739, issued Aug. 2, 1966 in the name of G. M. Gaskill et al. and assigned to the same assignee as the present invention.

The air vent control 12 of the comfort control system is operable to selectively communicate the inlet of the blower 11 with either fresh outside air or recirculated air within the interior passenger compartment of the vehicle. The air vent control 12 comprises a damper valve member 20 which is pivotally connected to an air inlet housing 21 by a pivot pin means 22 and which is movable between a first or normal position and a second position. When the valve member 20 is in its first position, as shown in the solid lines in FIG. 1, it blocks communication between a fresh air inlet 23 and the inlet of the blower 11 and communicates a passenger compartment inlet 24 with the inlet of the blower 11. When the valve member 20 is in its second position, as shown by the dotted lines in FIG. 1, it communicates the fresh air inlet 23 with the inlet of the blower 11 and blocks communication between the passenger compartment inlet 24 and the inlet of the blower 11. The air vent control 12 further includes a vacuum responsive means in the form of a vacuum actuated servomotor 28 operatively connected with the damper valve 20 for moving the same between its positions. A servomotor 28 comprises a housing 30 which is divided into upper and lower chambers 31 and 32 by a resilient diaphragm 34 extending thereacross. Attached to the diaphragm 34 and extending through an opening in the lower end wall 30a of the housing 30 is a reciprocable rod 35. The rod 35 at its end remote from the diaphragm 34 is pivotally connected to the damper valve 21 by a pivot pin means 36. The diaphragm 34 is biased toward a first position in which it holds the damper valve 21 in its first position, as shown by the solid lines in FIG. 1, by a compression spring 40 having one end secured to the upper side of the diaphragm 34 and its other end in abutting engagement with the upper end wall 30b of the housing 30. The lower chamber 32 of the housing 30 is in constant communication with the atmosphere via a bleed hole 41.

The damper valve 20 is moved from its first position, as shown by the solid lines in FIG. 1, to its second position, as shown by the dotted lines in FIG. 1, to emit fresh air into the housing 21 when the upper chamber 31 of the housing 30 is solely in communication with a vacuum source, preferably the engine intake manifold, and is returned to its first or solid line position by the spring 40 when the chamber 31 is also connected with an atmospheric air source. The upper chamber 31 is in constant communication with the engine intake manifold via conduits 42 and 43 and is in communication with a vent valve means 45 of the control mechanism 10 for controlling communication between the upper chamber 31 and the atmosphere.

The control mechanism 10 comprises, in general, a housing means 50 including a base 51, a stationary electrical terminal 52 carried by the base 51, the vent valve means 45 supported by the base 51 and an electromagnetic relay means 55 carried by the base 51 and which includes a selectively energizable coil 56 and an armature 60 for selectively controlling energization of the blower motor 11 and operation of the vent valve means 45, which in turn controls operation of the servomotor 28.

The housing means 50 of the control mechanism 10 comprises a rectangularly shaped metal cover 61 having a peripherally extending rim 62 at its lower end for supporting the base 51. The base 51 is generally rectangular in shape and is made from a suitable electrically insulating material. The base 51 at its periphery is stepped, as indicated by reference numeral 63, and the rim 62 of the metal cover 61 has a lower flange 62a which is initially coextensive or parallel with the adjacent sidewalls of the cover 61. The base 51 is secured to the cover 61 by positioning the stepped periphery 63 of the base 51 against the upper flange 62b of the rim 62 and then bending over the lower flange 62a to the position shown in FIG. 1. The interior of the housing means 50 is in constant communication with the atmosphere via a screened filter means 64 secured within a through opening 65 within the base 51.

The stationary electrical terminal 52 is adapted to be connected with a battery 66 of the vehicle and comprises a generally U-shaped member having one leg 52a thereof secured to the base and its other to the base and its other leg 52b carrying a contact 52c at its upper side. The lower leg 52a of the terminal 52 is secured to a metal connector 67 extending through the base. The metal connector 67 is connected to one post of the battery 66 via wire conductor 68, ignition switch 69 and wire conductor 70. The other post of the battery 66 is connected to a suitable ground $G_1$.

The vent valve means 45 includes a tubular valve portion or housing 71 which, in the illustrated embodiment, is formed integral with the base 51 and extends both interiorly and exteriorly of the housing means 50. The tubular portion 71 has an open upper end 71a which lies in or substantially in the same plane as the contact 52c of the terminal 52. The vent valve means 45 further is connected to conduit 42 and includes a semicircular shaped, resilient rubberlike valve member 74 carried by the armature 60.

The electromagnetic relay means 55 comprises a bracket 80 having a base portion 80a secured to the base 51 and an upwardly extending inverted L-shaped portion 80b for supporting one end portion 60a of the armature 70. The end portion 60a of the armature 60 is secured to the inverted L-shaped bracket portion 80b in any suitable manner, such as by rivets 83, and is supported thereby in a cantilever fashion. The bracket 80 is also connected to a metal connector 84, the connector in turn being connected to one end of the electric blower motor 13 by a wire conductor 86. The other end of the motor 13 is connected to a suitable ground $G_2$ by a wire conductor 87. Suitably secured to the base portion 80a of the bracket 80 is a relay coil 56. The relay coil 56 is disposed beneath the armature 60 intermediate the ends of the latter and has its upper end spaced from the armature 60.

The armature 60 is in the form of a thin, flexible leaf spring and has a bifurcated free end portion 60b which defines a pair of spaced parallel legs 90 and 91. The leg 90 at its free end carries a contact 92 which is normally spaced from but overlies the contact 52c of the stationary terminal 52 and the leg 91 at its free end carries the resilient valve member 74.

The leaf spring armature 60 is inherently or self-biased toward a normal or first position, as shown by the solid lines in FIGS. 1 and 2, in which the contact 92 carried by the leg 90 is disposed above and spaced from the stationary contact 52c and in which the resilient valve member 74 carried by the leg 91 is disposed above and spaced from the open upper end 71a of the tubular portion 71. When the armature 60 is in its normal position the circuit to the blower motor 13 is broken and the latter is deenergized and the vent valve means 45 is open to the atmosphere to communicate atmospheric pressure to the upper chamber 31 of the servomotor 28, which in turn allows the spring 40 to biasingly hold the damper valve 21 in the solid line position shown in FIG. 1 in which it effects communication between the passenger compartment inlet 24 and the inlet of the blower 11. The conduit 43, in the illustrated embodiment, includes a flow restrictor or restricted orifice 95 and the relative diameters of the conduit 42 and the orifice 95 are such that the air flow rate through the conduit 42 is greater than or at least equal to the flow rate past the orifice 95 so that the upper chamber 31 of the servo motor cannot be evacuated when the armature is in its first position.

The armature 60 is adapted to be moved or flexed to a second position, as shown by the dotted lines in FIG. 1, in response to energization of the coil 56. When the armature 60 is in its second position the contact 92 carried by the leg 90 engages the contact 52c of the stationary terminal to complete the circuit to the blower motor 13 to energize the same. This circuit is from battery 66, wire conductor 70, ignition switch 69 (which would be closed when operation of the comfort control system is desired), wire conductor 68, stationary terminal 52, armature 60, bracket 80, connector 84, wire conductor 86, blower motor 13, wire conductor 87 to ground $G_2$. The blower motor 13 will remain energized as long as the armature 60 is in its second position. Movement of the armature 60 to its second position also causes the leg 91 to move the resilient valve member 74 into engagement with the upper end 71a of the tubular portion 71 of the vent valve means 45 to block communication between the atmosphere and the upper chamber 31 of the servo motor 28. When this occurs the upper chamber 31 will be connected solely to engine intake manifold vacuum, which in turn causes the diaphragm 34 to be moved from its solid line position shown in FIG. 1 toward the upper end wall 30b of the housing 30 in opposition to the biasing forces of the spring 40. As the diaphragm 34 moves toward the upper end wall 30b of the housing 30 it will cause the damper valve 20 to be moved from its solid line position toward its dotted line position in which it communicates the inlet of the blower 11 with the fresh air inlet 23 and blocks communication between the inlet of the blower 11 and the interior passenger compartment inlet 24.

Energization and deenergization of the coil 56 is controlled by a suitable switch 100 in an operative electric circuit with the coil 56 and the battery 66. When the switch 100 is closed, a circuit will be completed from the battery 66, wire conductor 70, now closed ignition switch 69, wire conductor 68, now closed switch 100, wire conductor 101, terminal 102, through the relay coil winding 56, terminal 103, wire conductor 104, to ground $G_3$.

If it is desired to operate the blower 11 independently of the air vent control 12 so that it only recirculates the air in the passenger compartment, the operator would merely close normally open switch 110, which is in a parallel circuit with the armature 60 of the electromagnetic relay means 55.

From the foregoing, it should be apparent that the novel control mechanism 10 of the present invention provides a relatively simple compact and economical control mechanism. Moreover, the control mechanism 10 serves both as an electric switch and as a valve actuator or means for simultaneously energizing both an electrically operated and a pneumatically operated device. Furthermore, the provision of the bifurcated end portion 60b of the leaf spring armature 60 provides a pair of highly flexible legs 90 and 91 which enables the armature 60 to carry out its two functions even though the two legs have to be moved different distances in order to seat on their respective stationary contact 52c and open end 71a of the tubular portion 71 due to variations, within limits, in the heights of the stationary contact 52c or tubular valve portion or the contact 92 and valve member 74 on the armature. Thus, within limits, manufacturing tolerance variations are not critical, which greatly facilitates mass production of the control mechanism 10.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

I claim:

1. A control mechanism for use in simultaneously controlling operation of an electrical device and a fluid operated device comprising: a housing means; a stationary electrical terminal carried by said housing means and adapted to be connected in an electric circuit with the electrical device; valve means carried by said housing means for controlling communication between a fluid source and the fluid operated device; and an electromagnetic relay means supported by said housing means and including a selectively energizable coil and an armature supported adjacent one end of the coil and adapted to be connected in a circuit with the electrical device, said armature being a relatively thin flexible member and having first and second end portions respectively disposed adjacent said stationary electrical terminal and operatively connected with a movable valve member of said valve means, said armature being movable between a first position in which said first portion is not in engagement with said stationary terminal and said second portion positions said valve member in a position which opens said valve means to communicate the fluid source with the fluid operated device and a second position in which the first end portion is engageable with said stationary terminal to provide a conductive path therebetween and said second end portion positions said valve member in a position to effect closure of the valve means to block communication between the fluid source and the fluid operated device, said armature being self-biased toward one of said positions and being movable from said one position toward its other position in response to energization of said coil.

2. A control mechanism as defined in claim 1 wherein said armature is self-biased toward its first position and movable from its first position toward its second position in response to energization of said coil.

3. A control mechanism as defined in claim 2 wherein said valve means includes an open ended tubular portion carried by said housing and a resilient valve member carried by said second end portion.

4. A control mechanism for use in simultaneously controlling operation of an electrical device and a pneumatically actuatable device of an automotive vehicle comprising: a housing means; a stationary electrical terminal carried by said housing means; vent valve means supported by said housing means for controlling communication between the atmosphere and the pneumatically actuatable device; and an electromagnetic relay means supported by said housing means and which includes a selectively energizable coil and an armature supported adjacent one end of the coil; said armature and said stationary electrical terminal being adapted to be connected in an operative electric circuit with the electrical device; said armature being a relatively thin, flexible member and having a bifurcated free end portion defining first and second legs, said first leg being disposed above said electrical terminal and said second leg being connected with a valve member of said vent valve means, said armature being self-biased toward a first position in which said first leg is disengaged from said stationary electrical terminal and said second leg holds said valve member in an open position, said armature being movable in opposition to its self-biasing forces to a second position in which the first leg engages the stationary electrical terminal to provide a conductive path therebetween and in which the second leg moves said valve member to a closed position to block communication between the atmosphere and the fluid operated device in response to energization of said coil.

5. A control mechanism as defined in claim 4 wherein said vent valve means includes a tubular housing portion having an open end adjacent said second leg of said armature and a semicircular resilient valve member carried by said second leg.

6. A control mechanism for use in simultaneously controlling operation of a vacuum responsive means for opening and closing an air vent control for controlling the admission of fresh air to an inlet of an electrically driven blower for circulating the air within an interior passenger compartment of an automotive vehicle and the electrically driven blower comprising: a housing means including a base; a stationary electrical terminal carried by said base of said housing means; vent valve means having an open ended tubular portion supported by said base and being adapted to be operatively connected with the vacuum responsive means for controlling communication between the vacuum responsive means and an atmospheric air source and an electromagnetic relay means supported by said housing means and including a selectively energizable coil and an armature supported adjacent one end of the coil; said armature and said electrical terminal being adapted to be in an operative electric circuit with the electrically driven blower, said armature being a flexible leaf spring member having a bifurcated end portion defining first and second legs; said first leg being disposed adjacent said stationary electrical terminal and said second leg portion carrying a resilient valve member disposed adjacent the open end of said tubular portion of said vent valve means; said armature being self-biased toward a first position in which said first leg is spaced from said stationary electrical terminal and said second leg holds said resilient valve member spaced from said end of said tubular portion to provide communication between the atmosphere and the vacuum responsive means, said armature being movable in opposition to its self-biasing forces to a second position in which the first leg thereof engages said electrical terminal to provide a conductive path therebetween for energizing the electrically driven blower motor and in which said second leg holds said resilient valve member in engagement with the end of the tubular portion to block communication between the atmosphere and said vacuum responsive means in response to energization of said coil.

UNITED STATES PATENT OFFICE
CERTIFICATE OF CORRECTION

Patent No. 3,599,128      Dated August 10, 1971

Inventor(s)    Jonathan N. Fruth

It is certified that error appears in the above-identified patent and that said Letters Patent are hereby corrected as shown below:

Column 1, line 49, after "wherein" insert -- the armature has a bifurcated end, one leg of which --. Column 3, line 49, "secured to the base and its other to the base and its other leg" should read -- secured to the base and its other leg --; line 69, "one end portion 60a of the armature 70." should read -- one end portion 60a of the armature 60. --.

Signed and sealed this 14th day of March 1972.

(SEAL)
Attest:

EDWARD M. FLETCHER, JR.      ROBERT GOTTSCHALK
Attesting Officer      Commissioner of Patents